United States Patent [19]

Evans et al.

[11] Patent Number: 5,786,082

[45] Date of Patent: *Jul. 28, 1998

[54] LOOSE-FILL INSULATION HAVING IRREGULARLY SHAPED FIBERS

[75] Inventors: Michael E. Evans; John R. Mumaw, both of Granville; Roberta L. Alkire, Millersport; W. Scott Miller; Ronald A. Houpt, both of Newark; Russell M. Potter, Hebron; Tod D. Green, Somerset; David P. Aschenbeck, Newark; Clarke Berdan, II, Granville, all of Ohio

[73] Assignee: Owens Corning Fiberglas Technology, Inc., Summit, Ill.

[*] Notice: This patent issued on a continued prosecution application filed under 37 CFR 1.53(d), and is subject to the twenty year patent term provisions of 35 U.S.C. 154(a)(2).

[21] Appl. No.: 602,478

[22] Filed: Feb. 20, 1996

Related U.S. Application Data

[63] Continuation of Ser. No. 309,698, Sep. 21, 1994, abandoned, which is a continuation-in-part of Ser. No. 148,098, Nov. 5, 1993, Pat. No. 5,431,992.

[51] Int. Cl.$^6$ .............................. D02G 3/00; D04H 1/58; C03B 37/01; C04B 1/00
[52] U.S. Cl. ............... 428/369; 428/370; 428/373; 428/374; 428/392; 428/377; 428/399; 65/439; 65/438; 65/443; 52/143; 442/336; 442/331; 442/352; 442/353; 442/355; 442/362
[58] Field of Search ........................ 428/392, 397, 428/399, 373, 374, 369, 370; 65/437, 438, 439, 443; 52/743, 404.1; 442/336, 331, 352, 353, 355, 362

[56] References Cited

U.S. PATENT DOCUMENTS

| | | |
|---|---|---|
| 2,219,285 | 10/1940 | Allen et al. . |
| 2,998,620 | 9/1961 | Stalego . |
| 4,184,643 | 1/1980 | McCort . |
| 4,201,247 | 5/1980 | Shannon . |
| 4,296,164 | 10/1981 | Bemis et al. . |
| 4,347,985 | 9/1982 | Simpson . |
| 4,366,927 | 1/1983 | Kielmeyer . |
| 4,373,005 | 2/1983 | Goodwin . |
| 4,542,044 | 9/1985 | Gano et al. . |
| 4,555,447 | 11/1985 | Sieloff et al. . |
| 4,640,082 | 2/1987 | Gill . |
| 4,682,523 | 7/1987 | Johnson et al. . |
| 4,716,712 | 1/1988 | Gill et al. . |
| 4,756,957 | 7/1988 | Kielmeyer . |
| 4,829,738 | 5/1989 | Moss . |
| 4,842,928 | 6/1989 | Kielmeger . |
| 4,909,817 | 3/1990 | Gill et al. . |
| 5,035,936 | 7/1991 | Dockrill et al. . |
| 5,367,849 | 11/1994 | Bullock . |
| 5,431,992 | 7/1995 | Houpt et al. .................. 428/224 |

FOREIGN PATENT DOCUMENTS

| | | |
|---|---|---|
| 50-90774 | 7/1975 | Japan . |
| 95/12552 | 5/1995 | WIPO . |
| 95/12701 | 5/1995 | WIPO . |

*Primary Examiner*—William Krynski
*Assistant Examiner*—J. M. Gray
*Attorney, Agent, or Firm*—C. Michael Gegenheimer; Curtis B. Brueske

[57] ABSTRACT

A loose-fill insulation product having irregularly shaped glass fibers is provided. The loose-fill insulation product shows improved recovery, lower thermal conductivity and requires lower product densities than prior art loose-fill insulation at equivalent fiber diameters.

35 Claims, 5 Drawing Sheets

LOOSE-FILL INSULATION HAVING IRREGULARLY SHAPED FIBERS

This application is a continuation of Ser. No. 08/309,698, filed Sep. 21, 1994, now abandoned, which was a continuation-in-part of Ser. No. 08/148,098, filed Nov. 5, 1993, now U.S. Pat. No. 5,431,992, issued Jul. 11, 1995.

BACKGROUND OF THE INVENTION

The present invention relates to loose-fill or blowing-wool insulation for sidewall or attic installation, and in particular to loose-fill insulation comprising irregularly shaped glass fibers.

The use of glass fiber blowing-wool or loose-fill insulation is well-known and increasing in popularity. Loose-fill insulation is preferred by many contractors because it can be easily and quickly applied in both new construction, as well as in existing structures. Further, loose-fill insulation is a relatively low-cost material.

As the name implies, loose-fill insulation is not formed into a blanket or batt prior to installation. Rather, the product is generally installed by pneumatically blowing the loose-fill insulation into the desired area. Accordingly, loose-fill insulation in an unconstrained space, such as an attic, is not as compacted as blanket insulation, occupying a greater volume than an equivalent amount of blanket insulation. As a result, the thermal conductivity or k value of loose-fill insulation in current use is generally higher than that of blanket insulation. That is, loose-fill insulation currently used in the industry does not prevent the conduction of heat as well as blanket insulation. To compensate for the lower conductivity of loose-fill, it is applied in greater depth than blanket insulation to achieve an equivalent R-value. The need for additional material results in increased cost to the installer as well as the consumer.

Furthermore, in many applications, increased insulation depth is either not possible or impractical. For example, in sidewall installation, the depth (or in this instance the thickness of the wall) is limited by standard wall thicknesses such as 3.5 inches (8.9 cm) for a 2×4 (5×10 cm) wall or 5.5 inches (14 cm) for a 2×6 (5×15.2 cm) wall. To compensate for such thickness limits, a higher density loose-fill must be employed. In other words, more glass must be blown into the same amount of space. Again, this need for additional material results in an increased cost to the installer as well as the consumer. Also, in practice it has remained quite difficult to blow the required higher densities into the confined spaces of sidewalls.

When designing loose-fill or blown insulation products of glass fibers, the ideal insulation would have uniform spacing and density once installed. That is, the final product would preferably be free of gaps, spaces or voids. Insulation is basically a lattice for trapping air between the fibers and thus preventing movement of air. The lattice also retards heat transfer by scattering radiation. A more uniform spacing and density would minimize air movement and maximize scattering and, therefore, would have greater insulating capability.

Traditional loose-fill or blown insulation comprises traditional, straight, short fibers. Batts of traditional bindered or unbindered glass fibers are cut, compressed and bagged for shipment. Upon installation, the compressed loose-fill is added to the hopper of a blower where the loose-fill is mechanically recovered and broken into smaller portions. After being blown into position, numerous small gaps or voids remain between the blown portions of insulation. These voids raise the thermal conductivity of the insulation requiring more glass to be employed to achieve a specified insulating value. Further, the blown insulation includes relatively ineffective insulating flakes or wads of the insulation incorporated into the blown insulation. These flakes or wads add significantly to the density of the insulation, in essence increasing the amount of glass used relative to it's insulating value.

Accordingly, a need exists for an improved loose-fill insulating material with a uniform volume filling nature such that the blown insulation has greater recovery. Further, the need exists for a loose-fill or blown insulation product having lower thermal conductivities, thereby requiring less glass to achieve a desired insulation value.

SUMMARY OF THE INVENTION

These needs are met by the present invention whereby an improved loose-fill or blowing insulation is provided. The improved loose-fill insulation comprises glass fibers which are irregularly-shaped. The irregularly-shaped glass fibers have a uniform volume filling nature. This uniform volume filling nature manifests itself by filling in the voids or gaps in the insulation once it has been installed by, for example, blowing. As a result, the loose-fill insulation of the present application has lower thermal conductivities or k values than the loose-fill insulation of the prior art and/or requires a much lower density to achieve an identical k value. Further, due to the nature of irregularly-shaped glass fibers, the fibers are capable of being compressed to a much greater density for packaging and still provide adequate recovery of performance properties when installed. Thus, greater quantities of insulation may be packaged in the same container thereby reducing shipping costs.

In accordance with the preferred embodiment of the present invention, there is provided a loose-fill insulation product comprising irregularly-shaped glass fibers. The irregularly-shaped glass fibers have a substantially uniform volume filling nature. Further, the irregularly-shaped glass fibers are preferably binderless. The term "binderless" is intended to mean that binder materials comprise less than or equal to 1% by weight of the product. Further, "binder" is not meant to include materials added for dust suppression, lubrication or adhesive materials added for packaging or encapsulation purposes. In fact, the irregularly-shaped glass fibers of the present invention preferably include a dust suppressant/anti-static agent, such as mineral oil, a quaternary ammonium salt, or combinations thereof The insulation product preferably approximates the form of cubes and wisps. The wisps are more three-dimensional than the flakes, and of a lesser density than the wads, of the prior art thereby providing greater insulating value. As the insulation is installed, the wisps act to fill the voids between adjacent cubes. The wisps further act to fill the voids between adjacent cubes without substantially raising the density of the blown product. As a result, once installed the insulation loses the appearance of individual cubes. Rather, it has a more homogenous appearance and a substantially uniform volume filling nature.

In accordance with an additional aspect of the present invention, there is provided a loose-fill insulation product of irregularly-shaped glass fibers wherein the product has a thermal conductivity or k of less than about 0.400 Btu in/hrft$^2$ °F. (0.0576 Watts/m°C.) when installed to a density of 0.5 pcf(8.0 Kg/m$^3$) at an effective fiber diameter of 5 microns. Thermal conductivity is a measure of a material's ability to conduct heat. Preferably, the insulation has a k value of less than 0.385 Btu in/hrft$^2$ °F. (0.0554 Watts/m°C.) when installed to a density of 0.5 pcf (8.0 kg/m$^3$) and at an effective fiber diameter of 5 microns.

In accordance with a further aspect of the present invention, there is provided a loose-fill insulation product of irregularly shaped glass fibers wherein the product has a density of less than about 1.5 pcf (24 Kg/m$^3$) to achieve a resistance to heat flow or R value of 13 in a standard 3.5 inch (8.9 cm) sidewall at an effective diameter of 5 microns. R-value is the most common measure of an insulation product's ability to retard heat flow from a structure. Preferably, the product has a density of 1.250 pcf (20 Kg/m$^3$) to achieve an R value of 13 in a standard 3.5 inch (8.9 cm) sidewall at an effective fiber diameter of 5 microns, and more preferably a density of less than 1.2 pcf (19.2 Kg/m$^3$) for an R value of 13.

In accordance with another aspect of the present invention, there is provided a loose-fill insulation product wherein the product is capable of being installed to a density within the range of from about 0.3 to about 0.6 pcf (4.8 to 9.6 Kg/m$^3$) after compression of the insulation to a compressed density within the range of from about 12 to about 18 pcf (96 to 288 Kg/m$^3$). Preferably, the insulation product is capable of being installed to a density within the range of from about 0.3 to about 0.6 pcf (4.8 to 9.6 Kg/m$^3$) after compression of the insulation to a compressed density within the range of from about 15 to about 18 pcf (240 to 288 Kg/m$^3$). The insulation product of the present invention exhibits a recovery ratio of 24:1 to 50:1 and preferably from 30:1 to 50:1.

Accordingly, it is a feature of the present invention to provide a loose-fill insulation having improved properties over those of the prior art. It is a further feature of the present invention to provide a loose-fill insulation comprised of irregularly-shaped glass fibers having a substantially uniform volume filing nature, which is preferably binderless and in the approximate shape of cubes and wisps.

DETAILED DESCRIPTION OF THE INVENTION

Figure 1:
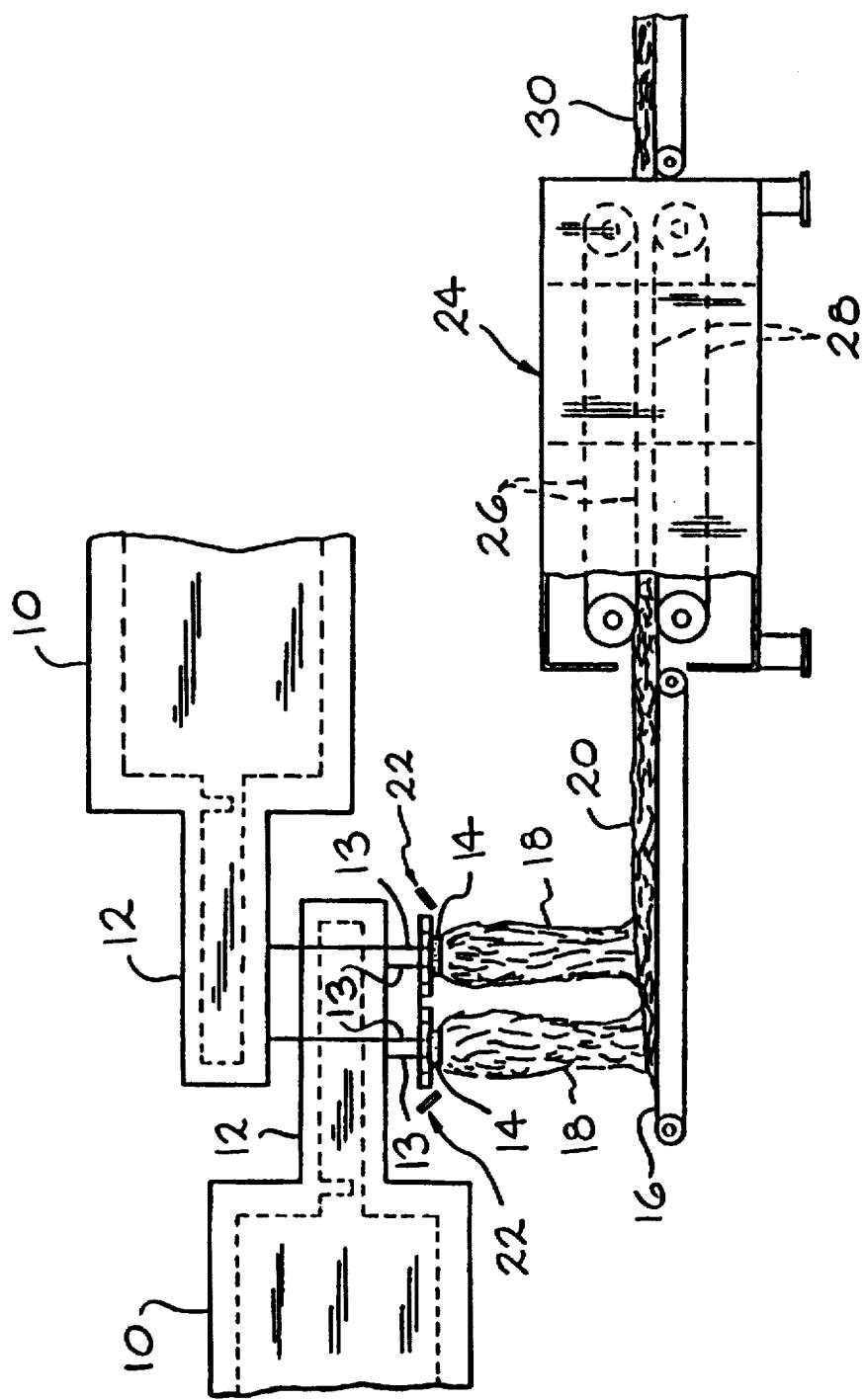
FIG. 1 is a schematic view in elevation of a process by which the insulation of the present invention may be produced.

The loose-fill insulation of irregularly shaped glass fibers of the present invention can be produced from a rotary fiber forming process as shown in FIG. 1.

Referring to FIG. 1, it can be seen that streams 13 of two distinct molten glass compositions (described in further detail below) are supplied from furnaces 10 via forehearths 12 to fiberizers 14. Veils of irregularly shaped glass fibers 18 produced in fiberizers 14 are blown downward by means of blowers 22 and collected on a conveyor 16 to form a fibrous blanket 20. As the fibers are blown downward and cool, they assume their irregular shape.

The blanket 20 is conveyed by conveyor 28 through a heat setting oven 24 where the blanket 20 is shaped and the fibers are fixed in position. When the irregularly-shaped glass fibers are constrained into the shape of an insulation blanket, the fibers are stressed in the manner of a compressed spring. When the stressed fibers are subjected to heat setting temperatures of from 700° to 1100° F. (371° to 593° C.), the fibers are relaxed, possibly by a creep mechanism, resulting in the stress being substantially released. Once the constraints are removed, the blanket 20 does not expand but holds the desired shape. Since the fibers bend as they cool, they become more entangled.

Alternatively, the fibers of the present invention may be collected by a direct form method. In a direct form method, the fibers are collected immediately below the fiberizer and shaped and formed into a blanket by opposing conveyors, rather than allowing the fibers to drop to a conveyor, cool, and be reheated as in a heat setting process. A suitable direct forming method is disclosed in U.S. patent application Ser. No. 08/240,428 filed May 10, 1994, entitled DIRECT FORMING METHOD OF COLLECTING LONG WOOL FIBERS, by Scott et al, now abandoned, the disclosure of which is herein incorporated by reference. Of course, one of ordinary skill in the art will recognize that heat setting and direct forming are optional aspects of the present invention, and that, other fabrication techniques may also be employed.

Figure 2:
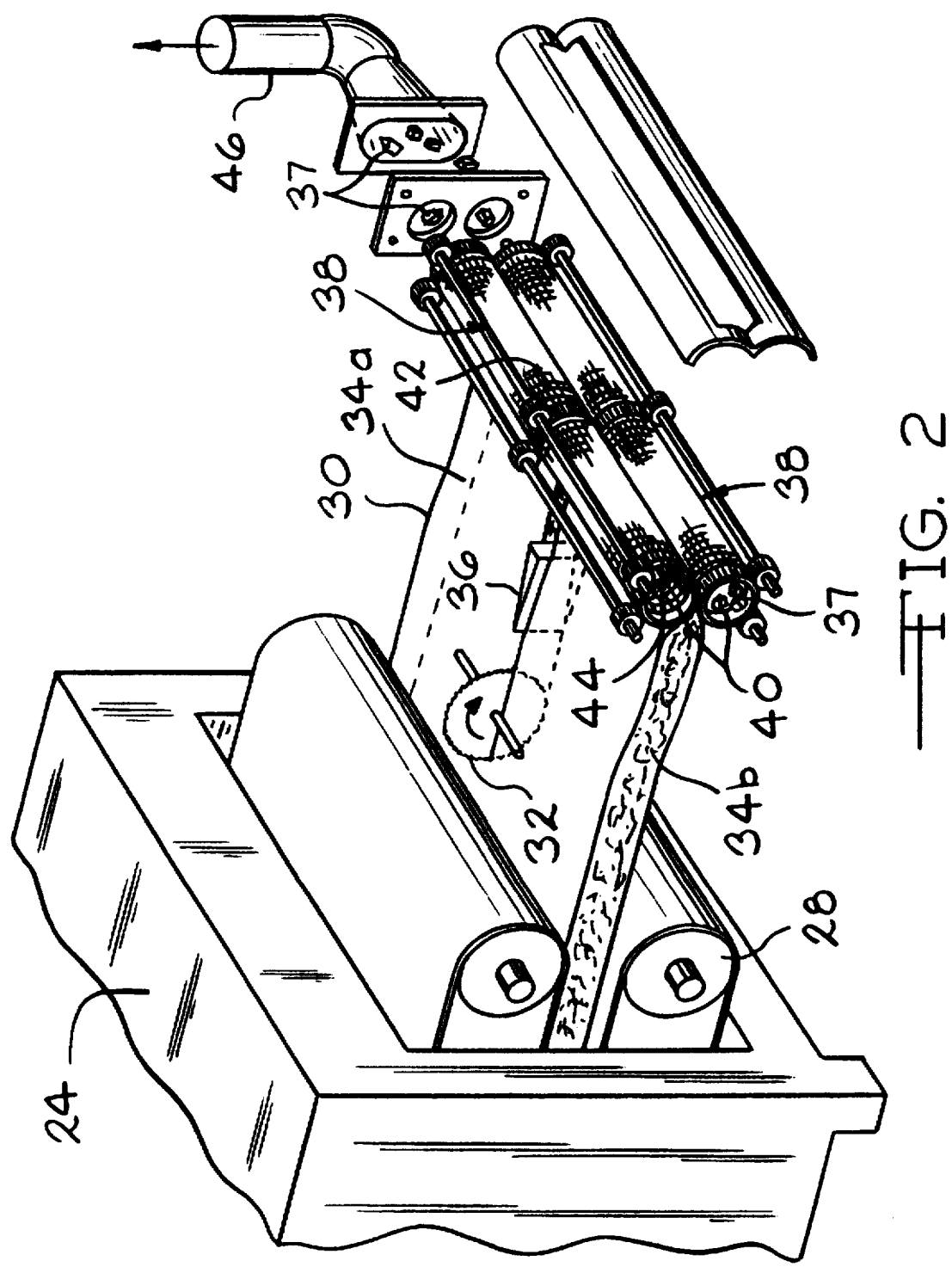
FIG. 2 is perspective view of a cutting and cubing device for making the loose-fill insulation of the present invention.

Turning to FIG. 2, once through the optional oven 24, shaped blanket 30 may be passed through a rotary saw 32 which splits the blanket into two column segments 34a and 34b and a wedge 36 moves the segments apart before they are fed between a pair of compression rolls (not shown). However, splitting is not required if the blanket is approximately 2' wide or less. The blanket segments 34a and 34b are then fed to identical cutting devices 38. The cutting devices 38 are hollow cutting cylinders 40 each perforated with generally square holes 42. In the devices 38, the blanket segments 34a and 34b are cut, preferably into cubes 37. The cubes 37 are preferably ½"–1" (1.2 to 2.5 cm) in any of the width, length or height directions.

Once cut, the cubes 37 drop through the holes 42 into the center 44 of the cylinders 40. The cubes 37 pass through the center 44 of the cylinders 40 into a series of ductwork 46 for delivery to a common hopper of conventional bagging machinery (not shown). The bagging machinery compresses the loose-fill insulation into bags for shipment and storage. Of course, one of ordinary skill in the art will recognize that various other cutting and bagging technologies may also be employed without departing from the scope of the invention. Suitable processes include those disclosed in U.S. Pat. Nos. 4,296,164, 4,542,044 and 4,682,523, the disclosures of which are all herein incorporated by reference. Once at the installation site, the loose-fill insulation may be installed by hand or preferably by blowing. Blowing can be performed with any conventional blowing technology known in the art.

Figure 3:
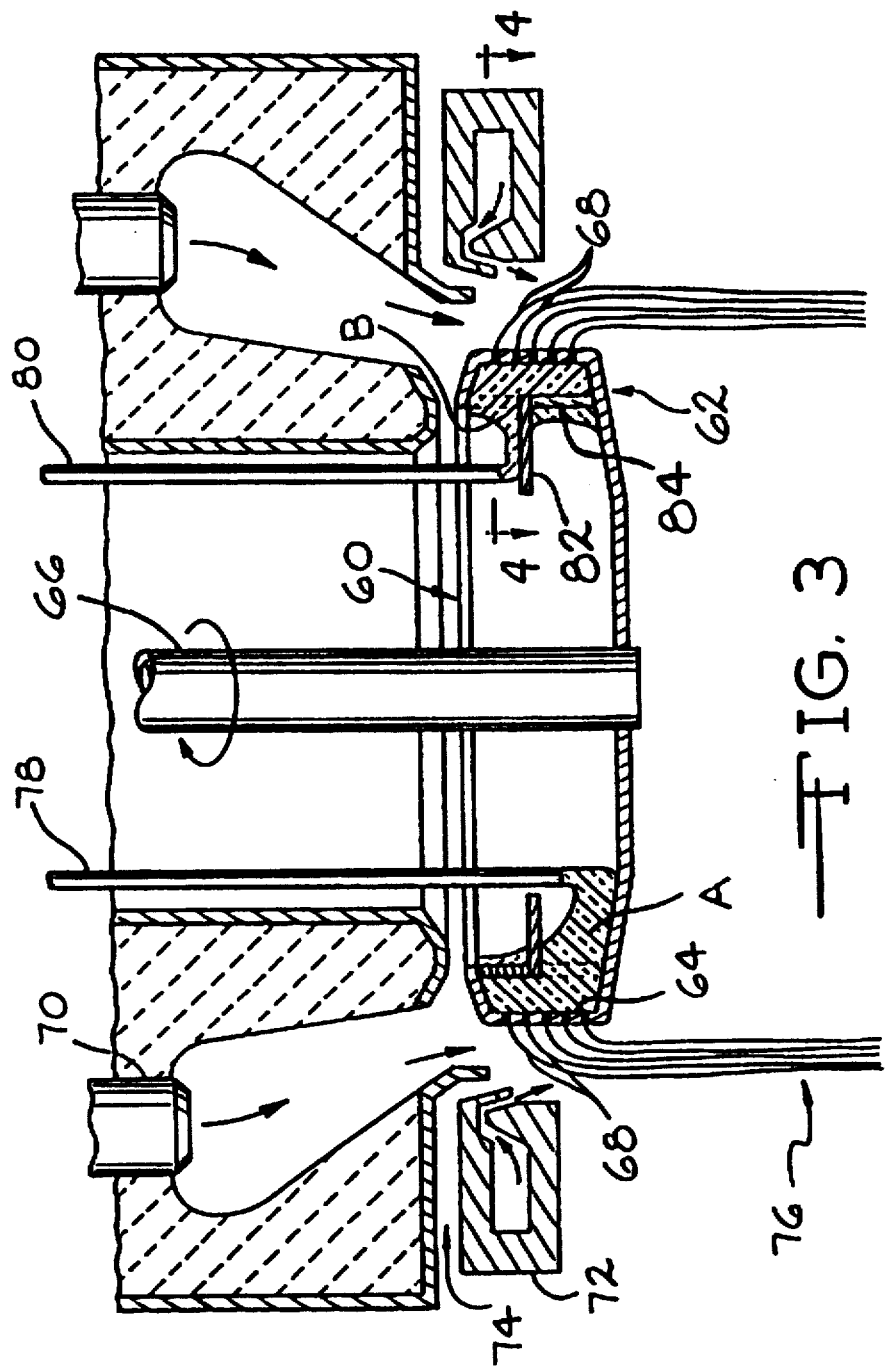
FIG. 3 is a cross-sectional view in elevation of a spinner by which the fibers of the present invention may be produced.

Turning to FIG. 3, there is seen a suitable spinner for the fiberizer of the present invention. As shown in FIG. 3, spinner 60 is comprised of spinner bottom wall 62 and spinner peripheral wall 64. The spinner is rotated on spindle 66, as is known in the prior art. The rotation of the spinner centrifuges molten glass through the spinner peripheral wall into primary fibers 68. The primary fibers are maintained in a soft, attenuable condition by the heat of annular burner 70. In one embodiment of the invention, an internal burner, not shown, provides heat to the interior of the spinner. Annular blower 72, may also be employed. Using induced air 74, annular blower 72 is positioned to pull the primary fibers and further attenuate them into secondary fibers 76, suitable for use in wool insulating materials. The secondary fibers, or dual-glass irregularly shaped glass fibers, are then collected for formation into a wool pack. Alternatively, the process of the present invention may be run so that there is little or no attenuation of the fibers.

The interior of the spinner is supplied with two separate streams of molten glass, first stream 78 containing glass A and second stream 80 containing glass B. The glass in stream 78 drops directly onto the spinner bottom wall and flows outwardly with centrifugal force toward the spinner peripheral wall to form a head of glass A. Glass B in molten glass stream 80 is positioned closer to the spinner peripheral wall than stream 78, and the glass in stream 80 is intercepted by horizontal flange 82 before it can reach the spinner bottom wall. Thus, a build-up or head of glass B is formed above the horizontal flange.

Figure 4:
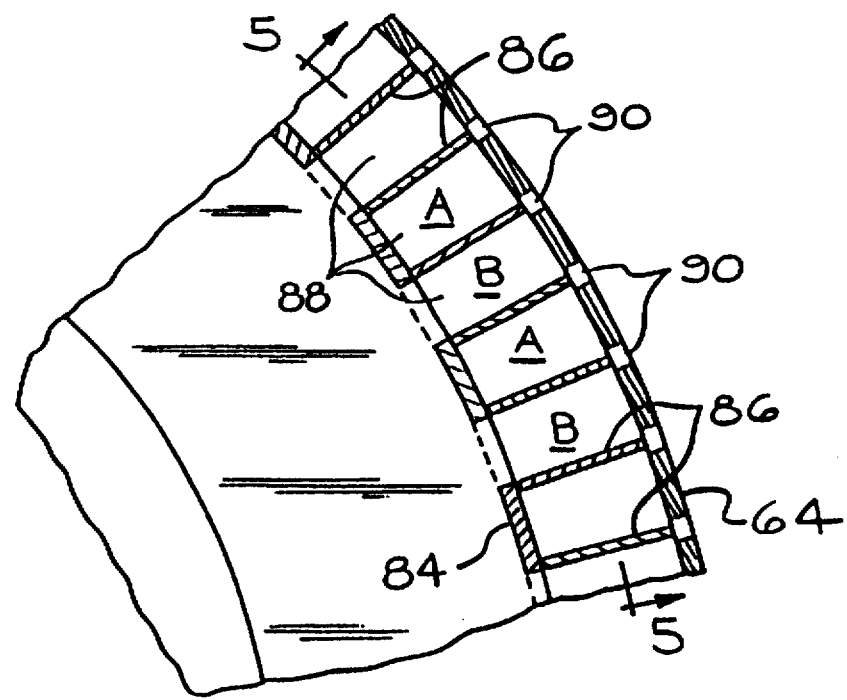
FIG. 4 is a plan view of a portion of the spinner of FIG. 3 taken along line 4—4.

As shown in FIGS. 3 and 4, the spinner is adapted with vertical interior wall 84 which is generally circumferential and positioned radially inwardly from the spinner peripheral wall. A series of vertical baffles 86, positioned between the spinner peripheral wall and the vertical interior wall, divide that space into a series of compartments 88. Alternate compartments contain either glass A or glass B.

Figure 5:
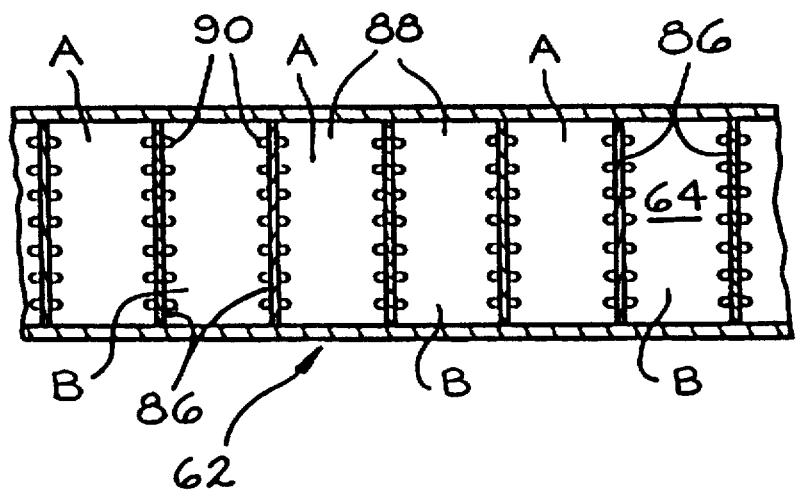
FIG. 5 is a schematic view in elevation of FIG. 4 taken along line 5—5.

The spinner peripheral wall is adapted with orifices 90 which are positioned adjacent the radial outward end of the vertical baffle. The orifices have a width greater than the width of the vertical baffle, thereby enabling a flow of both glass A and glass B to emerge from the orifice as a single dual-glass primary fiber. As can be seen in FIG. 5, each compartment 88 runs the entire height of spinner peripheral wall 64 with orifices along the entire vertical baffle separating the compartments. Other spinner configurations can be used to supply dual streams of glass to the spinner orifices.

The irregularly shaped fibers of the present invention are dual-glass fibers, i.e. each fiber is composed of two different glass compositions, glass A and glass B as will be described in greater detail below. If one were to make a cross-section of an ideal irregularly shaped glass fiber of the present invention, one half of the fiber would be glass A, with the other half glass B. In reality, a wide range of proportions of the amounts of glass A and glass B may exist in the various irregularly shaped glass fibers in the wool insulating material (or perhaps even over the length of an individual fiber). The percentage of glass A may vary within the range of from about 15 to about 85% of the total glass in each of the irregularly shaped glass fibers with the balance of total glass being glass B. In general, insulation products of the irregularly shaped fibers will consist of fibers of all different combinations of the percentages of glass A and glass B, including a small fraction of fibers that are single component.

Dual-glass fibers have a curvilinear nature due to the difference in thermal expansion coefficients of the two glasses. As a dual-glass fiber cools, one glass composition contracts at a faster rate than the other glass composition. The result is stress upon the fiber. To relieve this stress the fiber must bend. If no rotation of the fiber is introduced, a flat coil having a generally constant radius of curvature will be produced, the coil being in one plane such as in a clock spring. Rotation of dual-glass fibers can be measured by reference to the interface along the fiber between the two glass components. In order to get out of the plane, some rotation must be introduced. Constant rotation of the fibers will produce a helix having a constant pitch. The fiber making up the helix has a constant direction of rotation—either clockwise or counter-clockwise. The helix also has a generally constant radius of curvature.

An irregularly shaped fiber of the invention differs from a helical fiber in that the rotation of the fiber is not constant, but rather varies irregularly both in direction (clockwise and counter-clockwise) and in magnitude. The magnitude of rotation of a fiber is how fast the fiber rotates per unit length of the fiber. The curvature is generally constant as dictated by the difference in thermal expansion coefficients and the A/B glass proportions.

Figure 6:
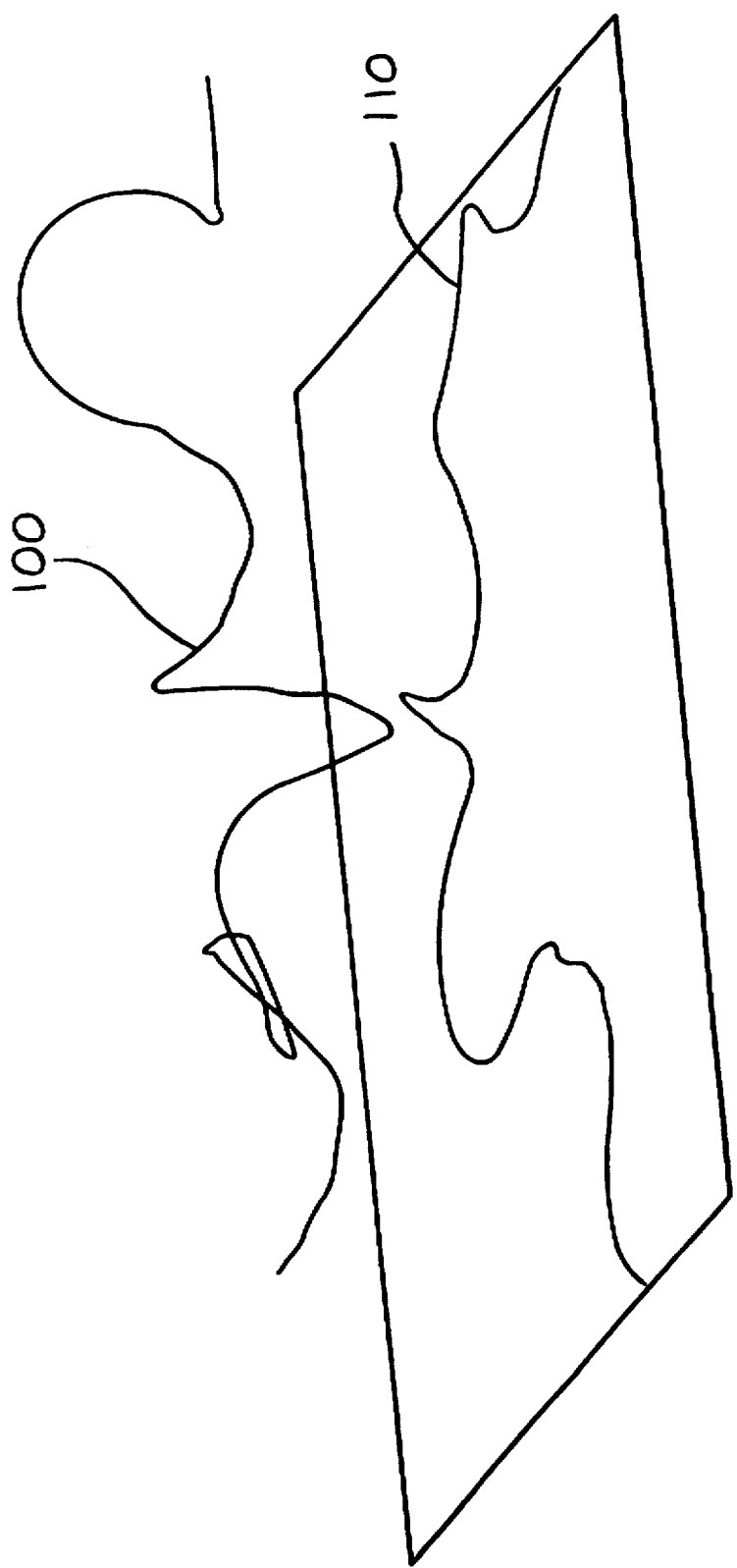
FIG. 6 is a schematic view of the irregularly-shaped glass fiber of the present invention.

Due to a continuously changing attenuation environment, each irregularly shaped fiber is twisted in a unique way. No two fibers are exactly alike. The final shape of the fiber is one with a baseline curvature due to the dual-glass nature, which is modified by the twisting, irregular rotation of the plane of curvature caused by the continuously changing or stochastic attenuation environment. The fiber has a baseline curvature that is twisted through three dimensions. It is generally not helical. An example of an irregularly shaped fiber 100 of the present invention is shown in FIG. 6. As an aid to visualization, the shadow 110 of the fiber cast by an overhead light onto a flat surface has been added. The fiber's irregular nature allows the irregularly shaped glass fibers to stand apart from one another and achieve a uniform volume filling nature. Additionally, loose-fill insulation material made of irregularly shaped glass fibers is less irritating (not as itchy) to the skin than loose-fill insulating materials made with primarily straight fibers, and may not be as dusty.

The irregular shape of the fibers gives the loose-fill insulating material a more uniform volume filling nature. The primarily straight fibers of the prior art are arranged haphazardly. Furthermore, when the insulation is blown into an attic or wall, it does not have an uniform appearance. Voids or gaps remain between the pieces of insulation, thereby substantially reducing the insulation's ability to retard heat flow. Thus, they are not uniform in volume filling. By uniform volume filling it is meant the fibers have a desire to spread out and fill the entire volume available to them in a uniform manner. A more uniform volume filling nature allows a more efficient use of glass fibers to resist the flow of heat.

In the loose-fill insulation of the present invention, the gaps or voids between the various pieces of insulation are filled in by wisps of the insulation. Wisps are smaller portions or even individual fibers which separate from the larger pieces of loose-fill insulation during the cutting, packaging and installation. In the present invention, these wisps, due to their irregular shape and volume filling nature, act to fill in the voids between the larger pieces of insulation. Thus, unlike prior art insulation, the installed loose-fill insulation of the present invention has a substantially uniform density and appearance.

Even more importantly, these wisps of insulation act to fill the voids without a substantial increase in the product density. Prior art insulation has flakes of insulation that separate from the larger portions of insulation. These flakes do lower thermal conductivity of the insulation. However, there is also a dramatic increase in product density. Thus, a larger amount of insulation is required to generate an equivalent R value. This translates into greater installation cost.

On the other hand, as shown in Example 1 below, in the loose-fill insulation of the present invention, the wisps act to fill in the voids, lowering thermal conductivity, yet without an increase in the density or amount of glass required to generate a required R value. This effect is believed to be due to the inherent ability of irregularly-shaped fibers to be compressed to a higher compression factor yet fully recover. Individual fibers or smaller flakes of the prior art have a tendency to shatter or break thereby reducing their effectiveness, yet not their overall weight. The wisps of irregularly shaped fibers of the present invention, on the other hand, resist shattering or breaking and fully recover when installed.

The uniform volume filling nature of an insulating material may be additionally indicated by measuring thermal conductivity. Building insulation products are quantified by their ability to retard heat flow. Resistance to heat flow or R value is the most common measure of an insulation product's ability to retard heat flow from a structure. R-value is defined by the equation: R value=t/k, where R-value is resistance to heat flow in hrft$^2$ °F./Btu (m$^2$ °C./Watts); t is recovered thickness in inches; and k is thermal conductivity in Btu in/hrft$^2$ °F. (Watt/m°C.).

Thermal conductivity or k value is a measure of a material's ability to conduct heat. Thus, the lower a material's k value the better that material is as an insulator. The more uniform the lattice of the material, the greater that material's insulation ability. Thus, thermal conductivity can be a measure of the uniform volume filling nature of the insulation material.

Furthermore, thermal conductivity becomes important in unconstrained thickness blows such as in attics. As R value may be merely adjusted by adjusting thickness, the lower the thermal conductivity, the lower the amount of insulation required. In constrained thickness blows, such as sidewall, thickness is fixed. Thus, k is also fixed for a specific R value at a given density. Accordingly, the only means to adjust R value in constrained thickness blows is with the density to which the product is installed.

In unconstrained thickness blows, loose-fill insulation products of the present invention result in a substantial reduction in k values from that of the prior art at identical product density and fiber diameter. For loose-fill insulating material at a fixed product density, 0.3 to 0.6 pcf (4.8 to 9.6 Kg/m$^3$), and fixed fiber diameter, loose-fill of the present invention show k values of up to about 48 k points lower than those of the best standard products of the prior art. At this density, one k point, or thousandths k, translates to approximately ½% glass fiber density needed for equivalent thermal performance. Thus, the wool insulating material of the present invention requires approximately 24% less glass than the prior art material to reflect the same k values and generate an equivalent R value. Once installed, by for example blowing, the loose-fill insulation product of the invention preferably exhibits improved k values of less than about 0.400 Btu in/hrft$^2$ °F. (0.0576 Watt/m°C.) at 0.5 pcf (8.0 Kg/m$^3$) and at an effective fiber diameter of 5 microns. Most preferably, the improved k values are less than about 0.385 Btu in/hrft$^2$ °F. (0.0554 Watt/m°C.) at 0.5 pcf (8.0 Kg/m$^3$) and at an effective fiber diameter of 5 microns.

In constrained thickness applications, the superior properties of the loose-fill insulation of the present invention is also demonstrated. As mentioned, in constrained thickness applications, as thickness is fixed, k is also fixed for a particular R value at a given density. Thus, performance of the insulation is determined by the density to which the loose-fill insulation must be installed in order to achieve the fixed k value. The loose-fill insulation of the present invention requires a product density of 28% less than those of the prior art at identical thicknesses, fiber diameters and R values. The loose-fill insulation of the present invention requires a density of less than 1.50 pcf, preferably less than 1.25 and most preferably less than 1.20 pcf, to achieve an R value of 13 in a standard 3.5 inch (8.9 cm) constrained thickness sidewall at an effective fiber diameter of 5 microns.

Insulation products are packaged in high compression in order to ship more insulation in a defined volume. At the point of installation the insulation product is unpackaged. Loose-fill insulation is added to the hopper of a standard blowing device where it is mixed and blown into position thereby expanding and recovering in the process.

The ability of an insulation product to recover depends upon both the uncompressed product density and the density to which the product is compressed. The compressed density is the density to which the loose-fill insulation can be compressed for shipping while still maintaining a satisfactory recovery. If a product is compressed to too high a density, a substantial portion of the glass fibers may break. As a result, the loose-fill will not be able to be blown to the lighter densities employed in unconstrained thickness applications, like attics. For prior art loose-fill insulation products of straight fibers, the maximum practical compressed density is from about 9 to about 11 pcf (144 Kg/m$^3$ to 176 Kg/m$^3$).

Loose-fill insulating materials of the present invention produce dramatically improved recovery properties. This increase in recovery ability is due to the unique shape and properties of the irregularly shaped fibers. Due to the binderless nature of the irregularly shaped glass fibers of the present invention, one would expect them to slide upon compression as do the binderless straight fibers of the prior art. However, the irregularly shaped fibers cannot slide very far because the irregular shapes catch on neighboring fibers, thereby preventing significant movement. Further, there is no binder placing stress on the fibers near the intersections. Rather, the irregularly shaped fibers of the present invention twist and bend in order to relieve stress. Thus, the fibers' positions are maintained and any available energy for recovery is stored in the fiber. This stored energy is released when the compression is removed and the fibers return to their recovered position.

The term recovery ratio in the present invention is defined as the ratio of recovered density to compressed density, after an insulation product is compressed to the compressed density, unpackaged, and installed to a desired density. For example, an insulation product compressed to a density of 6 pcf (96 Kg/m$^3$) which recovers to 0.5 pcf (8 Kg/m$^3$) has a recovery ratio of 12:1. Loose-fill insulation of the present invention may be compressed to a compressed density within the range of about 12 to about 18 pcf (192 to 288 Kg/m$^3$) and is capable of being installed to a density of within the range of about 0.3 to about 0.6 pcf (4.8 to 9.6 Kg/m$^3$). This is a recovery ratio within the range of from 24:1 to about 50:1. Preferably, insulation products of the invention will be compressed to a compressed density within the range of from about 15 to about 18 pcf (240 to 288 Kg/m$^3$) and recover to a recovered density within the range of from about 0.3 to about 0.6 pcf (4.8 to 9.6 Kg/m$^3$).

The effect of this dramatic increase in the amount of compression that can be applied to the loose-fill insulation products of the present invention while still maintaining a satisfactory recovered density is significant. For standard loose-fill insulation products, compressed density can be increased from around 11 pcf (176 Kg/m$^3$) to about 15 pcf (240 Kg/m$^3$) by employing irregularly shaped glass fibers of the present invention. This translates to around 25% as much insulating material which can be shipped in the same volume shipping container, such as a truck or rail car. The potential savings in shipping cost is enormous. Additionally, the more highly compressed insulation products provide benefits in storage and handling for warehousing, retailing and installing the product.

As mentioned earlier, the loose-fill insulation of the present invention, preferably is formed by cutting wool insulation batts into columns of prisms, approximate cubes and wisps of various thicknesses. The shapes are preferably between ½ to 1½ inches (1.3 to 3.8 cm) in any of the width, length, or height directions, most preferably ¾ inches, with a 3 to 6 micron fiber diameter range being preferred. Most preferably, the loose-fill insulation of the present invention comprises approximate cubes and wisps of various thicknesses.

Additionally, a portion of the loose-fill insulation may be coated with a dust suppressant/anti-static agent. Preferably, the dust suppressant is a mineral oil, quaternary ammonium salt or combinations thereof If a quaternary ammonium salt is employed, the dust suppressant/anti-static agent is preferably is a modified fatty dimethyl ethylammonium ethosulfate. Suitable quaternary ammonium salts are disclosed in U.S Pat. No. 4,555,447 to Sieloffet al, the disclosure of which is herein incorporated by reference. To aid in coating ability, the quaternary ammonium salt may be mixed with a non-ionic lubricant material. A suitable dust suppressant/ anti-static agent is available under the tradename MAZON JMR-1 and is available from PPG Industries, Inc. in Pittsburgh, Pa. The dust suppressant/anti-static agent may be applied by traditional means such as dilution with water, followed by spraying onto the cut loose-fill insulation.

To achieve the unique irregularly shaped glass fibers of the present invention, specific compositions satisfying a number of restraints are required. The first constraint involves the coefficient of thermal expansion. There is no direct constraint on the values for the coefficient of thermal expansion of either glass A or glass B. Preferably, however, the coefficients of thermal expansion of glass A and glass B, as measured on the individual glasses by standard rod techniques, differ by at least 2.0 ppm/°C.

Another constraint for satisfactory commercial production of irregularly-shaped glass fibers is viscosity temperature, which is the temperature at which the glass viscosity is 1000 poise as measured by a standard rotating cylinder technique. It is commonly referred to as the log3 viscosity temperature. The log3 viscosity temperature is preferably within the range of from about 1850° F. (1010° C.) to about 2050° F. (1121° C.), more preferably within the range of from about 1900° F. (1037° C.) to about 2000° F. (1093° C.), and most preferably about 1950° F. (1065° C.).

An additional constraint of the glass is that of liquidus temperature. The liquidus of a glass is the highest temperature at which crystals are stable in the molten glass. With sufficient time, a glass at a temperature below its liquidus will crystallize. Crystallization in the furnace can lead to the formation of solid particles which, once passed to the fiberizer, become lodged in the orifices of the spinner, plugging them. The difference between the log3 viscosity temperature and the liquidus for each of glass A and glass B of the dual-glass composition in the present invention is preferably at least 50° F. (28° C.), and more preferably more than about 200° F. (111° C.) lower than the log3 viscosity temperature. If this constraint is not met, crystallization may occur in the lower (i.e. colder) part of the spinner blocking the spinners orifices.

A further constraint on the glass composition of the present invention is glass durability. Durability relates to two glass insulation properties. The first is the ability of the loose-fill insulation to recover when it is opened for installation. The second is the long term physical integrity of the insulation. If the glass chemical durability is too low, upon installation the insulation could fail to recover to its design thickness. Whether the insulation fails to fully recover or disintegrates too quickly, the result is a failure of the insulation to adequately insulate.

A useful measure of the chemical durability of a glass fiber for an insulation application is obtained by measuring the percent weight loss of 1 gram of 10 micrometer diameter fibers after 2 hours in 0.1 liters of distilled water at 205° F. (96° C.). The durability so measured depends strongly on the composition of the glass fibers and, to a lesser, extent, on the thermal history of the fiber. To assure adequate performance of the loose-fill, fibers of each of the dual glass compositions should exhibit a weight loss in this test of less than about 4% and preferably less than about 2.5%. In addition to its strong dependence on glass composition, the chemical durability of a glass fiber depends to a lesser extent on its thermal history. Thus, for example, heating a glass fiber for several minutes at 1000° F. (538° C.), will improve its chemical durability somewhat. It is understood that the limits on chemical durability disclosed here refer to measurements on glass fibers with no heat treatment other than that employed in their original attenuation.

Since loose-fill insulation typically contains some fibers that are thin enough to be respirable if they break into short lengths, it is possible that some fibers may become airborne and be inhaled. In the body, they will be exposed to physiological fluids. To the extent that the dissolution rate of the fibers in the body plays a role in the biological activity of inhaled fibers, it may be preferable to produce glass fibers with a relatively high dissolution rate in such fluids. The dissolution rate of glass fibers is expressed as the dissolution rate constant measured for fibers in simulated lung fluid at 98° F. (37° C.). It depends strongly on the glass fiber composition and, to a lesser extent, on its thermal history. It is preferable to use glass compositions having a dissolution rate constant of at least 100 ng/cm$^2$ hr for all insulation fibers. Therefore the dissolution rate constant for fibers of each of the dual glass compositions is preferably at least 100 ng/cm$^2$ hr. As with the chemical durability, subsequent heat treatment of the fiber will reduce its dissolution rate. It is understood that the 100 ng/cm$^2$ hr limit refers to fibers formed into loose-fill insulation in the final product form.

The dual-glass compositions of the present invention comprising one high-borate, low-soda lime-aluminosilicate composition as glass A and one high-soda, low-borate lime-aluminosilicate composition as glass B satisfy all constraints necessary for a successful irregularly-shaped fiber. By high-borate, low-soda lime-aluminosilicate composition, it is intended that the glass composition have a borate content of within the range of about 14% to about 24% by weight of the total components. By a high-soda, low-borate lime-aluminosilicate composition, it is intended that the glass composition have a soda content within the range of from about 14% to about 25% by weight of the total components.

Preferably, the first glass composition comprises by weight percent from about 50 to about 61% silica or $SiO_2$, from about 0 to about 7% alumina or $Al_2O_3$, from about 9 to about 13% lime or CaO, from about 0 to about 5% magnesia or MgO, from about 14–24% borate or $B_2O_3$, from about 0 to about 10% soda or $Na_2O$, and from about 0 to about 2% potassium oxide or $K_2O$.

The second glass composition is preferably one which comprises by weight percent from about 52 to about 60% silica or $SiO_2$, from about 0 to about 8% alumina or $Al_2O_3$, from about 6 to about 10% lime or CaO, from about 0 to about 7% magnesia or MgO, from about 0 to about 6% borate or $B_2O_3$, from about 14 to about 25% soda or $Na_2O$, and from about 0 to about 2% potassium oxide or $K_2O$. It is understood that in each composition there will typically be less than about 1% total of various other constituents such as, for example $Fe_2O_3$, $TiO_2$ and SrO, not intentionally added to the glass, but resulting from the raw materials used in the batch formulation.

More preferably, the dual-glass composition of the present invention comprises a first glass composition containing approximately 52–57% silica, 4–6% alumina, 10–11% lime, 1–3% magnesia, 19–22% borate, 4–6% soda, 0–2% potassium oxide, and a second glass composition containing approximately 57–65% silica, 2–6% alumina, 8–9% lime, 4–6% magnesia, 0–6% borate, 15–21% soda, and 0–2% potassium oxide.

EXAMPLE 1

In unconstrained thickness blows of cubed, primarily straight bindered fibers of loose-fill insulation sold under the trademark ADVANCED THERMOCUBE PLUS, commercially available from Owens-Corning Fiberglas, 0.0183 lb/R-sf were required to achieve an R-30 value or a density of 0.517 pounds per cubic foot with fibers of 4.75 microns in diameter. The loose-fill insulation of the present invention comprising binderless irregularly-shaped dual glass fibers, on the other hand, required only 0.0140 to 0.0173 lb/R-sf to achieve an R-30 value or a density of 0.420 to 0.519 pounds per cubic foot with fibers of 4.75 microns in diameter. This translates to 5.5% to 24% less glass required for the loose-fill insulation of the present invention as compared to that of the prior art to achieve the same R-value. This demonstrates the superior ability of the loose-fill insulation of the present invention to lower thermal conductivity or k while not raising the amount of insulation required for a specific R value. In other words, k is lowered without increasing required density.

EXAMPLE 2

In an R-30 blow of cubed, primarily straight bindered fibers of ADVANCED THERMOCUBE PLUS at a fiber diameter of 4.75 microns, and a density of 0.500 pcf, required 12.75 inches of material and provided a k of 0.432 Btu in/hrft$^2$ °F. (0.0622 Watt/m°C.) and a R-30 at an lb/R-sf of 0.018. To achieve the same R-30 blow, the binderless, irregularly shaped dual-glass loose-fill insulation of the present invention at a fiber diameter of 4.75 microns and density of 0.500 pcf, required 11.00 inches of material and provided a k of 0.385 Btu in/hrft$^2$ °F. (0.0554 Watts/m°C.) and a R-30 lb/R-sf of 0.016. Accordingly, the loose-fill insulation of the present invention required over 13% less glass to achieve the equivalent R factor in an unconstrained thickness application. This demonstrates the lower thermal conductivity achieved with the loose-fill insulation of the present invention, in unconstrained thickness blows into attics.

EXAMPLE 3

The cubed, primarily straight, bindered fibers of ADVANCED THERMOCUBE PLUS required a density of 1.70 pcf to achieve an R-13 rating when blown into a standard 3.5 inch sidewall at a fiber diameter of 4.75 microns. The binderless, irregularly shaped dual-glass loose-fill insulation of the present invention required a density of 1.250 pcf to achieve the same R-13 rating when blown into a standard 3.5 inch sidewall at a fiber diameter of 4.75 microns. Accordingly, the insulation of the prior art in a sidewall requires 26% more glass to achieve an equivalent R value. This demonstrates the advantages of the present invention in requiring a lower density, i.e. less glass, for an equivalent R value over the insulation of the prior art in restrained thickness blows into sidewalls.

Having described the invention in detail and by reference to the preferred embodiments thereof, it will be apparent that modifications and variations are possible without departing from the scope of the invention which is defined in the appended claims.

We claim:

1. A loose-fill insulation product comprising irregularly shaped glass fibers having a substantially uniform volume filling nature, wherein each of the irregularly-shaped glass fibers comprises two distinct glass compositions with different coefficients of thermal expansion and has a rotation which varies irregularly along its length both in direction and in magnitude.

2. The loose-fill insulation product as claimed in claim 1, wherein said irregularly shaped glass fibers are binderless.

3. The loose-fill insulation product as claimed in claim 1 having a k value of less than 0.400 Btu in/hrft$^2$ °F. (0.0576 Watt/m°C.) at 0.5 pcf (8.0 Kg/m$^3$) and at an effective fiber diameter of 5 microns.

4. The loose-fill insulation product as claimed in claim 3 having a k value of less than 0.385 Btu in/hrft$^2$ °F. (0.0554 Watt/m°C.) at 0.5 pcf (8.0 Kg/m$^3$) and at an effective fiber diameter of 5 microns.

5. The loose-fill insulation product as claimed in claim 1 having a density of less than 1.50 pcf (24 Kg/m$^3$) to achieve an R value of 13 in a standard 3.5 inch constrained thickness sidewall at an effective fiber diameter of 5 microns.

6. The loose-fill insulation product as claimed in claim 5 having a density of less than 1.250 pcf (20 Kg/m$^3$) to achieve an R value of 13 in a standard 3.5 inch constrained thickness sidewall at an effective fiber diameter of 5 microns.

7. The loose-fill insulation product as claimed in claim 6 having a density of less than 1.20 pcf (19.2 Kg/m$^3$) to achieve an R value of 13 in a standard 3.5 inch constrained thickness sidewall at an effective fiber diameter of 5 microns.

8. The loose-fill insulation product as claimed in claim 1 wherein at least a portion of said irregularly shaped glass fibers surfaces are coated with a dust suppressant, anti-static agent or both.

9. The loose-fill insulation product as claimed in claim 8 wherein said dust suppressant or anti-static agent is mineral oil, a quaternary ammonium salt or combinations thereof.

10. The loose-fill insulation product as claimed in claim 1 wherein said insulation comprises approximately shaped cubes of various thicknesses in addition to wisps of various thicknesses after cutting, handling and installation of said insulation product.

11. The loose-fill insulation as claimed in claim 10 wherein upon handling and installation of said insulation said wisps fill any existing voids between said cubes providing said insulation with a substantially uniform appearance and density.

12. A loose-fill insulation product comprising irregularly shaped glass fibers having a k value of less than 0.400 Btu in/hrft² °F. (0.0576 Watt/m°C.) at 0.5 pcf (8.0 Kg/m³) and at an effective fiber diameter of 5 microns, wherein each of the irregularly-shaped glass fibers comprises two distinct glass compositions with different compositions with different coefficients of thermal expansion and has a rotation which varies irregularly along its length both in direction and in magnitude.

13. The loose-fill insulation product as claimed in claim 12 having a k value of less than 0.385 Btu in/hrft² °F. (0.0554 Watt/m°C.) at 0.5 pcf (8.0 Kg/m³) and at an effective fiber diameter of 5 microns.

14. The loose-fill insulation product as claimed in claim 12, wherein said irregularly shaped glass fibers are binderless.

15. The loose-fill insulation product as claimed in claim 12 wherein at least a portion of said irregularly shaped glass fibers surfaces are coated with a dust suppressant, anti-static agent or both.

16. The loose-fill insulation product as claimed in claim 15 wherein said dust suppressant or anti-static agent is mineral oil, a quaternary ammonium salt or combinations thereof.

17. The loose-fill insulation product as claimed in claim 12 wherein said insulation comprises approximately shaped cubes of various thicknesses in addition to wisps of various thicknesses after cutting, handling, and installation of said insulation product.

18. The loose-fill insulation as claimed in claim 17 wherein upon cutting, handling, and installation of said insulation said wisps fill any existing voids between said cubes providing said insulation with a substantially uniform appearance and density.

19. A loose-fill insulation product comprising irregularly shaped glass fibers having a density of less than 1.50 pcf (24 Kg/m³) to achieve an R value of 13 in a standard 3.5 inch sidewall at an effective fiber diameter of 5 microns, wherein each of the irregularly-shaped glass fibers comprises two distinct glass compositions with different coefficients of thermal expansion and has a rotation which varies irregularly along its length both in direction and in magnitude.

20. The loose-fill insulation product as claimed in claim 19 having a density of less than 1.250 pcf (20 Kg/m³) to achieve an R value of 13 in a standard 3.5 inch sidewall at an effective fiber diameter of 5 microns.

21. The loose-fill insulation product as claimed in claim 20 having a density of less than 1.20 pcf (19.2 Kg/m³) to achieve an R value of 13 in a standard 3.5 inch sidewall at an effective fiber diameter of 5 microns.

22. The loose-fill insulation product as claimed in claim 19, wherein said irregularly shaped glass fibers are binderless.

23. The loose-fill insulation product as claimed in claim 19 wherein at least a portion of said irregularly shaped glass fibers surfaces are coated with a dust suppressant, anti-static agent or both.

24. The loose-fill insulation product as claimed in claim 23 wherein said dust suppressant or anti-static agent is mineral oil, a quaternary ammonium salt or combinations thereof.

25. The loose-fill insulation product as claimed in claim 19 wherein said insulation comprises approximately shaped cubes of various thicknesses in addition to wisps of various thicknesses after cutting, handling and installation of said insulation product.

26. The loose-fill insulation as claimed in claim 25 wherein upon handling and installation of said insulation said wisps fill any existing voids between said cubes providing said insulation with a substantially uniform appearance and density.

27. A loose-fill insulation product comprising irregularly shaped glass fibers having a substantially uniform volume filling nature, said insulation product being in the form of approximately shaped cubes of various thicknesses and wisps of various thicknesses after cutting, handling, and installation of said insulation product, wherein each of the irregularly-shaped glass fibers comprises two distinct glass compositions with different coefficients of thermal expansion and has a rotation which varies irregularly along its length both in direction and in magnitude.

28. The loose-fill insulation as claimed in claim 27 wherein upon handling and installation of said insulation said wisps fill any existing voids between said cubes providing said insulation with a substantially uniform appearance and density.

29. The loose-fill insulation product as claimed in claim 27, wherein said irregularly shaped glass fibers are binderless.

30. The loose-fill insulation product as claimed in claim 27 wherein at least a portion of said irregularly shaped glass fibers surfaces are coated with a dust suppressant, anti-static agent or both.

31. The loose-fill insulation product as claimed in claim 30 wherein said dust suppressant or anti-static agent is mineral oil, a quaternary ammonium salt or combinations thereof.

32. A loose-fill insulation product comprising irregularly shaped glass fibers having a substantially uniform volume filling nature, said insulation having a recovery ratio of from about 24:1 to about 50:1, wherein each of the irregularly-shaped glass fibers comprises two distinct glass compositions with different coefficients of thermal expansion and has a rotation which varies irregularly along its length both in direction and in magnitude.

33. The loose-fill insulation product as claimed in claim 32 wherein said recovery ratio is from 30:1 to about 50:1.

34. A compressed loose-fill insulation product comprising irregularly-shaped glass fibers, the loose-fill insulation product being compressed to a density within the range of from about 12 to about 18 pcf (192 to 288 Kg/m³), the compressed loose-fill insulation product recovering to a density within the range of from about 0.3 to about 0.6 pcf (4.8 to 9.6 Kg/m³) upon handling and installation of the compressed loose-fill insulation product, and wherein each of the irregularly-shaped glass fibers comprises two distinct glass compositions with different coefficients of thermal expansion and has a rotation which varies irregularly along its length both in direction and in magnitude.

35. The compressed loose-fill insulation product as claimed in claim 34 wherein said loose-fill insulation product is compressed to a density of from about 15 to about 18 pcf (240 to 288 Kg/m³) and recovers to a density of from about 0.3 to about 0.6 pcf (4.8 to 9.6 Kg/m³) upon handling and installation of the compressed loose-fill insulation product.

* * * * *